(12) United States Patent
Neti et al.

(10) Patent No.: US 7,295,979 B2
(45) Date of Patent: Nov. 13, 2007

(54) LANGUAGE CONTEXT DEPENDENT DATA LABELING

(75) Inventors: Chalapathy Venkata Neti, Yorktown Heights, NY (US); Nitendra Rajput, New Delhi (IN); L. Venkata Subramaniam, New Delhi (IN); Ashish Verma, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 1150 days.

(21) Appl. No.: 09/790,296

(22) Filed: Feb. 22, 2001

(65) Prior Publication Data

US 2002/0152068 A1 Oct. 17, 2002

Related U.S. Application Data

(60) Provisional application No. 60/236,982, filed on Sep. 29, 2000.

(51) Int. Cl.
*G10L 15/06* (2006.01)
*G10L 15/00* (2006.01)

(52) U.S. Cl. ............. 704/243; 704/254; 704/255; 704/277; 704/244

(58) Field of Classification Search ............ 704/1, 704/2, 8, 9, 256–257, 245, 243–244, 254–255, 704/277
See application file for complete search history.

(56) References Cited

U.S. PATENT DOCUMENTS

| | | | | |
|---|---|---|---|---|
| 5,477,451 A | * | 12/1995 | Brown et al. | 704/9 |
| 5,579,436 A | * | 11/1996 | Chou et al. | 704/244 |
| 6,085,160 A | * | 7/2000 | D'hoore et al. | 704/256.2 |
| 6,092,044 A | * | 7/2000 | Baker et al. | 704/254 |
| 6,212,500 B1 | * | 4/2001 | Kohler | 704/256 |
| 6,324,510 B1 | * | 11/2001 | Waibel et al. | 704/256 |
| 6,581,034 B1 | * | 6/2003 | Choi et al. | 704/238 |
| 6,912,499 B1 | * | 6/2005 | Sabourin et al. | 704/243 |
| 2002/0040296 A1 | * | 4/2002 | Kienappel | 704/220 |

OTHER PUBLICATIONS

Zhan et al; "Janus-II: Towards Spontaneous Spanish Speech Recognition;" Spoken Language, 1996. ICSLP 96. Proceedings. Fourth International Conference on , vol. 4 , Oct. 3-6, 1996; pp. 2285-2288 vol. 4.*

Cohen et al; "Towards a Universal Speech Recognizer for Multiple Languages;" Automatic Speech Recognition and Understanding, 1997. Proceedings., 1997 IEEE Workshop on , Dec. 14-17, 1997; pp. 591-598.*

Mukherjee et al, "On Deriving a Phoneme Model for a New Language," Proceedings: IEEE International Conference on Spoken Language Processing (ICSLP 2000), Beijing, China, Oct. 16-20, 2000.*

(Continued)

*Primary Examiner*—Patrick N. Edouard
*Assistant Examiner*—James S. Wozniak
(74) *Attorney, Agent, or Firm*—Pete Tennent; Ryan, Mason & Lewis, LLP

(57) ABSTRACT

Bootstrapping of a system from one language to another often works well when the two languages share the similar acoustic space. However, when the new language has sounds that do not occur in the language from which the bootstrapping is to be done, bootstrapping does not produce good initial models and the new language data is not properly aligned to these models. The present invention provides techniques to generate context dependent labeling of the new language data using the recognition system of another language. Then, this labeled data is used to generate models for the new language phones.

18 Claims, 3 Drawing Sheets

OTHER PUBLICATIONS

Reichert et al, "Mandarin Large Vocabulary Speech Recognition Using the Globalphone Database", Eurospeech 99, 1999, pp. 815-818.*

J. Köhler, "Multi-Lingual Phoneme Recognition Exploiting Acoustic-Phonetic Similarities of Sounds," ICSLP, pp. 2195-2198, 1996.

O. Anderson et al., "On the Use of Data-Driven Clustering Techniques for Identification of Poly- and Mono-Phonemes for Four European Languages," ICASSP, pp. I/121-I/124, 1994.

T.A. Faruquie et al., "Translingual Visual Speech Synthesis," IEEE International Conference on Multimedia and Expo (ICME 2000), pp. 1089-1092, New York, USA, Jul. 30-Aug. 2, 2000.

T. Schultz et al., "Language Independent and Language Adaptive Large Vocabulary Speech Recognition," Proc. ICSLP-98, Sydney, 1998.

B. Wheatley et al., "An Evaluation of Cross-language Adaptation For Rapid HMM Development in a New Language," Proc. ICASSP, pp. 237-240, Adelaide, 1994.

T. Schultz et al., "Adaptation of Pronunciation Dictionaries for Recognition of Unseen Languages," Speech and Communication, St. Petersburg, Russia, Oct. 1998.

MA Chi Yuen et al., "Using English Phoneme Models for Chinese Speech Recognition," ISCSLP, pp. 80-82, Dec. 1998.

* cited by examiner

LANGUAGE CONTEXT DEPENDENT DATA LABELING

CROSS REFERENCE TO RELATED APPLICATIONS

This application claims priority to the U.S. provisional patent application identified by Ser. No. 60/236,982, filed on Sep. 29, 2000, and entitled "Context Dependent Data Labeling for Bootstrapping," the disclosure of which is incorporated by reference herein.

FIELD OF THE INVENTION

The present invention generally relates to speech recognition systems and, more particularly, to techniques for generating a speech recognition system for one spoken language (i.e., a new language) based on a speech recognition system originally generated for another spoken language (i.e., a base language).

BACKGROUND OF THE INVENTION

Depending on the application with which a speech recognition system is being employed, it may be quite useful to be able to utilize a speech recognition system originally trained in accordance with a first spoken language when building a speech recognition system for recognizing utterances input in a second spoken language. However, there are several issues that must be considered before such an operation can be implemented due to differences between the first language and the second language. From an acoustic or phonetic point of view, differences between the two languages may be characterized as falling into one of three types of cases.

In a first case, some sounds in the two languages may be similar. This is a fortuitous case since the speech recognition system originally trained in the first language would likely be able to recognize certain words uttered in the second language, preferably with some training, due to their acoustic or phonetic similarities.

In a second case, some sounds in the first or "base" language may not occur in the second or "new" language. In this case, such sounds can be ignored when building the new language speech recognition system.

In a third case, some sounds may not be present in the base language but may exist in the new language. This is obviously the most difficult case. A known technique used to handle this case involves building the new language speech recognition system via "bootstrapping" from a well-trained speech recognition system, i.e., the base language sounds are bootstrapped to produce the closest matching sound in the new language.

Bootstrapping is a very common technique used to generate the initial phone models for a new language recognition system, see, J. Kohler, "Multi-lingual phoneme recognition exploiting acoustic-phonetic similarities of sounds," ICSLP, 2195-2198, 1996; and O. Anderson, P. Dalsgaard and W. Barry, "On the use of data-driven clustering technique for identification of poly- and mono-phonemes for four European languages," ICASSP, 1/121-1/124, 1994, the disclosures of which are incorporated by reference herein. Models for all the new sounds are built using the bootstrapping procedure and then the speech data in the new language is aligned to these models. However, since the new sounds of the new language do not have the models that are built from the same sounds, the alignment is not proper. Moreover, when building the context dependent models, the sounds in all the contexts can not be formed by uttering the particular sounds in all the contexts while collecting the data. Also, the new language data can not be labeled until there exists a system which could align this new language data. Using a base language recognition system for the new language speech is also seen in MA Chi Yuen and Pascale Fung, "Adapting English Phoneme Models for Chinese Speech Recognition," ISCSLP, 80-82, December 1998; and T. A. Faruquie, C. Neti, N. Rajput, L. V. Subramaniam, A. Verma, "Translingual Visual Speech Synthesis," IEEE International Conference on Multimedia and Expo (ICME 2000), New York, USA, Jul. 30-Aug. 2, 2000, the disclosures of which are incorporated by reference herein.

Consider this problem as one wherein we have an n-dimensional space and there are clusters of points in this space, each of which are from a particular context of the occurrence of a sound. Each point in this n-dimensional space represents a particular utterance of sound. Since the n-dimensions have been chosen to be such that the acoustic characteristics of the sound are best represented and that the sounds which represent the same phoneme/arc/context form a well-clustered non-overlapping group, the space becomes the best representation of sounds that occur in the language for which the space has been trained. Bootstrapping for a new language then involves a regrouping of these points into clusters so that each cluster now represents the phone/arc/context of the new language. Each cluster is then modeled by an appropriate function and this model then becomes a representation of the particular phone/arc/context for the new language.

This technique however has its limitations. For example, there are areas in this space wherein there are no points. These represent the sounds that do not occur in the base language. If the new language has sounds that fall in this region, bootstrapping cannot provide solutions to model the phone/arc/context of this region. But since these are initial models which get better over iterations, bootstrapping still is used widely to build the initial models. Moreover, in the speech context, the points may be so close in the space that the voids can be filled up by forming a huge space spanning these voids too, albeit, through a very crude model.

Another possible solution may be that one can attempt to "speak up" or train those phones in all contexts and form features which represent the points in the space and thereby fill up the voids. However, since each point in the space is typically representative of 10 milliseconds of speech, speaking such isolated utterances is not possible. So, this solution has its drawback in that the sounds can be uttered in the new language but it is not possible to label each of these 10 millisecond utterances as one of the phones in a particular context.

Accordingly, there is a need for data labeling techniques which permit the generation of a speech recognition system for one spoken language (i.e., a new language) based on a speech recognition system originally generated for another spoken language (i.e., a base language) which overcome these and other limitations associated with conventional techniques.

SUMMARY OF THE INVENTION

The present invention provides data labeling techniques which permit the generation of a speech recognition system for one spoken language (i.e., a new language) based on a speech recognition system originally generated for another spoken language (i.e., a base language) which overcome the above-described and other limitations associated with conventional techniques. In general, the present invention accomplishes this by labeling context dependent data associated with the new language which is then used to generate the models for sounds in the new language which do not exist in the base language. The models may then be further used by a speech recognition engine to recognize speech input in the new language thus forming a new language speech recognition system.

In one aspect, the invention provides a technique for aligning speech data of a first language (i.e., a new language) to a phone set associated with the first language using a speech recognition system trained in accordance with a second language (i.e., a base language). The technique comprises: (i) applying a mapping to a phonetic vocabulary built using the first language phone set to generate a first language phonetic vocabulary mapped to a phone set associated with the second language; (ii) aligning speech data, input in the first language, to the first language phonetic vocabulary mapped to the second language phone set using the speech recognition system trained in accordance with the second language; and (iii) realigning the aligned speech data to the first language phone set.

It is to be appreciated that the mapping applied to the phonetic vocabulary built using the first language phone set may be a many-to-one mapping. That is, two or more phones from the new language may be associated with one phone from the base language. Further, the aligning operation may comprise labeling feature vectors, generated from the input speech data, by phones that the feature vectors represent in the phonetic space of the second language phone set. The realigning operation may then comprise relabeling the feature vectors by clustering the feature vectors according to phones of the first language phone set. More specifically, the relabeling operation may comprise sequentially comparing phonetic spellings of lexemes aligned to the second language phone set to phonetic spellings associated with the first language phone set.

In another aspect, the invention provides a technique for generating a speech recognition system for a first language using a speech recognition system previously generated for a second language. The technique may comprise first performing the mapping, aligning and realigning operations described above in order to generate the realigned training speech data. Then, acoustic models may be constructed using the realigned training speech data. This may be accomplished using well-known context dependent tree generation procedures. The constructed acoustic models are then associated with a speech recognition engine for subsequent use in recognizing real-time input speech data uttered in the first language.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
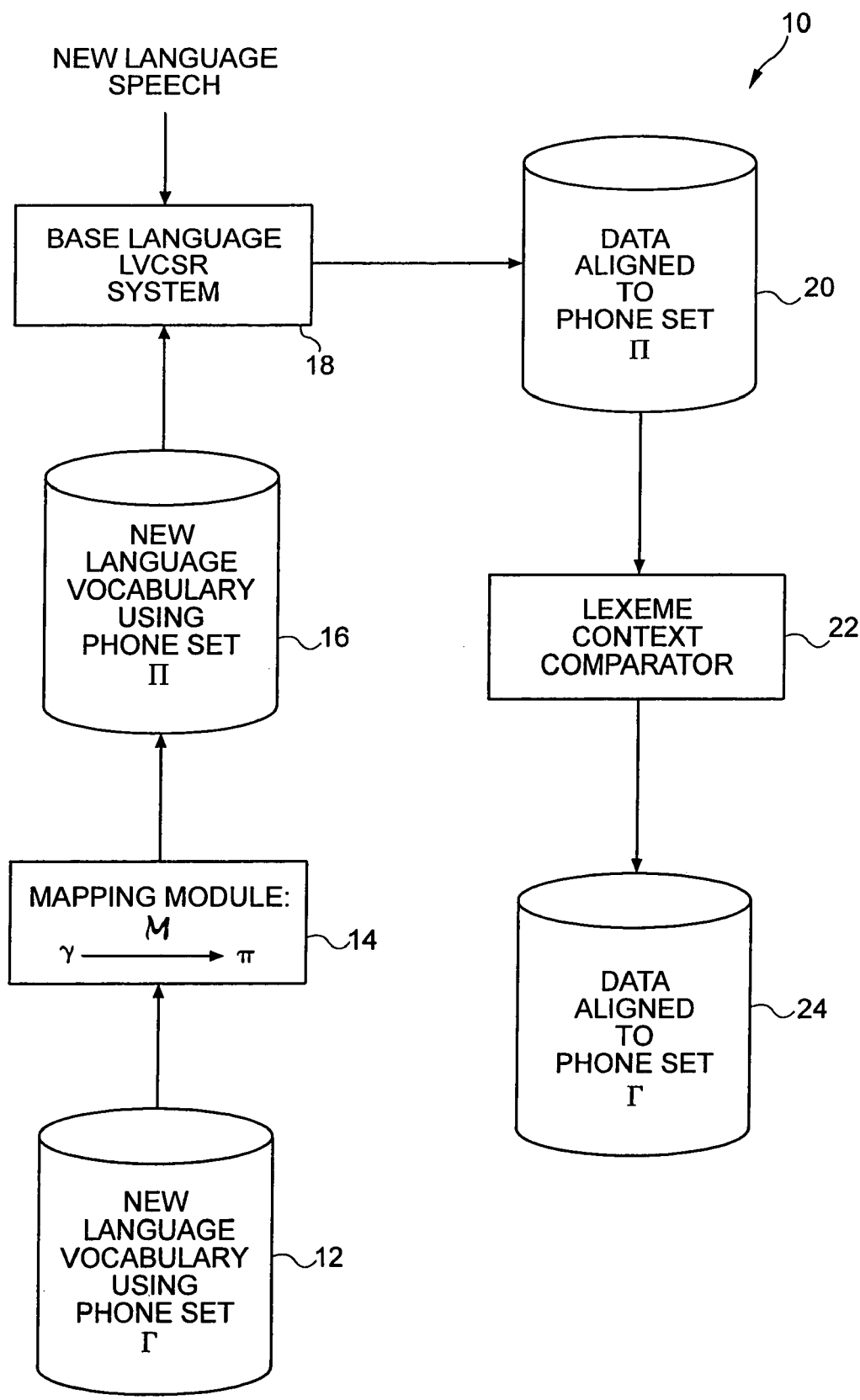
FIG. 1 is a block diagram illustrating one embodiment of a data labeling system for generating labeled data for use by a speech recognition system for a first spoken language by using a speech recognition system trained in a second spoken language.

It is to be appreciated that the following terminology will be employed in describing illustrative embodiments of the invention below. A "base language" is the spoken language in which a trained speech recognition system already exists. By the term "trained," it is understood that the acoustic models used by the speech recognition system have been created in accordance with input training data from the base language. A "new language" is the spoken language in which a speech recognition system is to be built. The symbol "$\Gamma$" refers to a new language phone set. The symbol "$\Pi$" refers to a base language phone set. The symbol "$\mathcal{M}$" refers to a mapping applied in accordance with the present invention which maps the new language phone set to the base language phone set. Conversely, conventional bootstrapping techniques attempted to map the base language phone set to the new language phone set.

Generally, as will be illustrated in detail below, the invention provides a technique to perform context dependent labeling of a new language data using a base language speech recognition system and then to use this labeled data to fill up the voids in the space of sounds. Such a data labeling technique according to the invention provides for inputting continuous speech data uttered in the new language and using the base language speech recognition system to align the new language vectors. Then, the technique provides for generating the new data labeled to the new phone set by using the lexeme contexts in the two languages.

Advantageously, in accordance with the invention, since the n-dimensional space is being populated with the actual sounds of the new language, the models so created are more representative of the sound than would otherwise be created by the conventional model creating techniques which, as previously explained, force the formation of a model using points that lie in another coordinate.

It is to be appreciated that while the labeling performed in accordance with the present invention is able to yield approximate phone boundaries, the data so generated can be used as input in a first step to form initial acoustic models. The actual formation of the acoustic models may be done using context dependent tree generation, as will be explained in the next paragraph. These initial phone models can be further iterated to form the final acoustic models used by a new language speech recognition system.

The inventive technique preferably may use a k-phone context model to build a tree for each arc/phone and, thus, feature vectors that have been aligned to the new language phone set should be used. Each of these vectors also should have k previous and k next phone contexts on which questions are to be asked. Questions may be asked as follows. Assume that there is a model for each phone but that these models are highly overlapping. Because of this, speech recognition systems use context dependent phone models. For creating context dependent phone models, questions like: "Is the previous phone 'AA' or 'AX'?" are asked on all the data for each phone. These questions are used to create what are called "context dependent trees." Each phone has one such tree and the leaves of such a tree form the context for the phone and a model is created for each leaf, thus forming phone models that are context dependent. For further details, refer to Bahl et al., "Robust Methods for Using Context-dependent Features and Models in a Continuous Speech Recognizer," ICASSP, 1994, the disclosure of which is incorporated by reference herein.

Given the above general description of certain features and advantages of the context dependent data labeling technique of the invention, a detailed illustrative explanation of the technique will now follow.

In accordance with the inventive technique, the new language phonetic space is populated with continuous speech sentences of the new language using the base speech recognition system. New language words are represented by phones from the new language phone set Γ to form a phonetic vocabulary of new language words. Each word in this vocabulary has a pronunciation represented by a set of phonemes. This is known as the baseform of the word. Alternate pronunciations (a word can have more than one pronunciation) in this vocabulary are referred to as lexemes. Since the base language recognition system is trained on phone set Π, a mapping $M$ is used for mapping the new language baseforms from the phone set Γ to phone set Π. Mapping $M$ is different from the mapping used in the conventional bootstrapping technique in the sense that, in the conventional mapping, each element in the new language phone set has one and only one corresponding element in base language phone set. Also, the conventional mapping works on the phonetic space, while mapping $M$ works on each $\gamma \epsilon \Gamma$ such that:

$\gamma$ - - - $M$ - - -> $\pi$, where $\pi \epsilon \Pi$.

Since more than one element in phone set Γ may map to a single element in phone set Π, mapping $M$ is considered a "many-to-one" mapping and cannot be used in reverse to obtain $\gamma$ for all the $\pi \epsilon \Pi$. This mapping is used so that the new language vocabulary can be represented by a base language phone set that can then be recognized by a base language speech recognition system. On the other hand, the conventional mapping is employed when bootstrapping is used to attempt to generate the new language acoustic models from the base language acoustic models.

The inventive technique is illustrated in FIG. 1. In FIG. 1, a data labeling system 10 is depicted which serves to generate labeled data for use by a speech recognition system for the new language by using a speech recognition system trained in the base language. The system 10 comprises: a storage unit 12 for storing the new language vocabulary using phone set Γ; a new language-to-base language mapping module 14, coupled to storage unit 12; a storage unit 16 for storing the new language vocabulary using phone set Π, coupled to mapping module 14; a base language large vocabulary continuous speech recognition (LVCSR) system 18, coupled to storage unit 16; a storage unit 20 for storing data aligned to phone set Π, coupled to LVCSR system 18; a lexeme context comparator 22, coupled to storage unit 20; and a storage unit 24 for storing data aligned to phone set Γ, coupled to comparator 22.

As shown in FIG. 1, the new language phonetic vocabulary is first built using the new language phone set Γ. This can be accomplished manually by a person having knowledge of what sound each phoneme creates in each context. However, automatic baseform builders also exist which can create most baseforms, although one pass of manual supervision over the generated baseforms is still typically done. This new language phonetic vocabulary is stored in storage unit 12. The mapping module 14 then employs the mapping $M$ to generate the vocabulary of new language baseforms using the base language phone set Π. The new language phonetic vocabulary, now mapped to the base language phone set Π, is then stored in storage unit 16. This phonetic vocabulary along with the continuous speech data uttered in the new language is fed as input to the base language speech recognition system 18 which then aligns the new language speech to the lexemes in the base language phone set Π. Thus, each feature vector has now been labeled by a phone $\pi \epsilon \Pi$ that it represents in the phonetic space of the base language phone set Π. This alignment is then converted to represent the data labeled in accordance with the new language phone set Γ. To accomplish this task, the new language data aligned to lexemes written in the base language phone set Π is fed as input to the lexeme context comparator 22. The comparator 22 operates sequentially on the data and compares the phonetic spelling of the two lexemes (one represented by the base language phone set Γ and other by the new language phone set Π) and maps the labels from the base language phones/arcs to the new language phone/arcs. The result is that the speech data input to the base language speech recognition system is now aligned to the new language phone set Γ. This data is stored in storage unit 24.

If a particular phoneme in the base language is used to represent more than one new language phoneme, numbering of the phones in the words results in the correct new language phone being chosen. It is to be understood that operating sequentially over the time axis on the lexemes of the two languages helps in resolving the many-to-one mapping in the phone sets of the two languages.

Accordingly, the above-described technique creates the alignment of the continuous new language speech data to the new language phone set without the help of any new language trained speech recognition system. This data alignment stored in storage unit 24 serves as labeled data for use in generating initial acoustic models for a new language speech recognition system. This may be accomplished using well-known context dependent tree generation techniques, as mentioned above. Of course, the new language system can be further trained by iterating over these acoustic models.

It is to be understood that any inaccurate phone boundaries are a result of phonetic space differences in the two languages owing to the different acoustic characteristics of the languages. This depends on the two languages; if the languages are acoustically very similar, very accurate phone boundaries are formed using the above-described technique.

Figure 2:
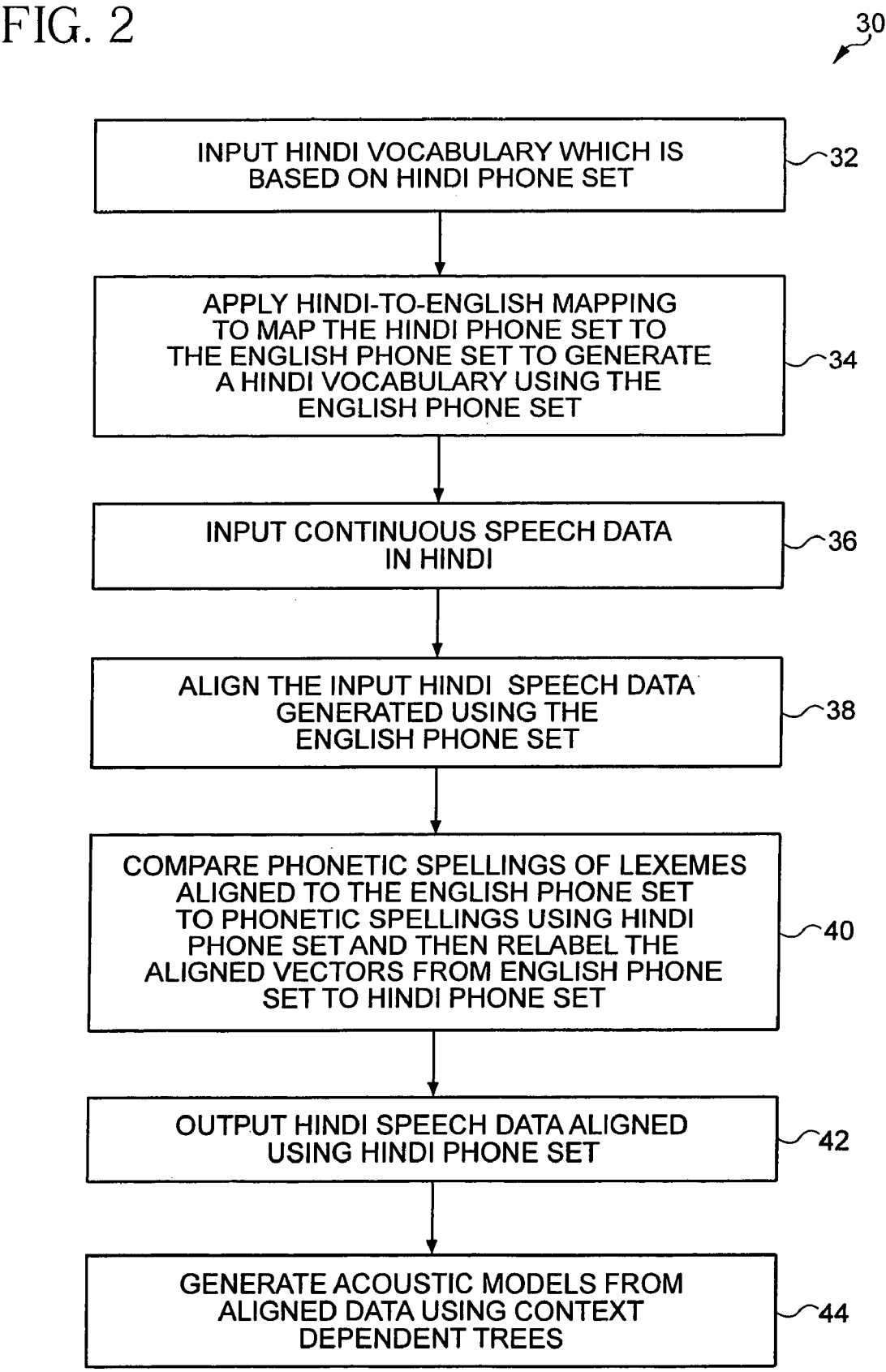
FIG. 2 is a flow diagram illustrating one embodiment of a data labeling methodology of the invention in terms of English as the base language and Hindi as the new language.

Referring now to FIG. 2, a flow diagram of one embodiment of the data labeling methodology of the invention is shown in terms of an illustrative base language and an illustrative new language. In this example, the base spoken language and corresponding phone set Π upon which the LVCSR system 18 is originally trained is English, while the new spoken language and corresponding phone set Γ upon which the new language LVCSR system is to be built is Hindi. Of course, it is to be appreciated that the invention is not limited to any particular pair of spoken languages. Here, we describe a preferred embodiment of the above approach to the context of generating Hindi phone models from an English speech recognition engine. It is to be appreciated that the method 30 shown in FIG. 2 may be executed in accordance with the system 10 shown in FIG. 1.

First, Hindi data is used to get initial phone models. That is, in step 32, the system inputs the Hindi vocabulary which is based on a Hindi phone set. The text corresponding to Hindi pulse code modulated files is then written using the English baseforms. That is, in step 34, the system (e.g., the mapping module 14) applies a Hindi-to-English mapping to map the Hindi phone set to the English phone set to generate a Hindi vocabulary using the English phone set. For those phones of Hindi which are not present in English, the closest English phone is chosen in the baseforms.

In step 36, continuous speech training data in Hindi is input to the system. In step 38, the system (e.g., the LVCSR system 18) then aligns the training data using the Hindi vocabulary which was generated using the English phone set. After the alignment is generated, the baseforms of Hindi are used to cluster the vectors corresponding to Hindi phones. That is, in step 40, the phonetic spellings of lexemes aligned to the English phone set are compared to the phonetic spellings using the Hindi phone set and the labels of the aligned vectors from the English phone set are then relabeled to the Hindi phone set. Therefore, the system makes use of two vocabularies, one in which the baseforms are in Hindi phonology and the other one in which baseforms are in English phonology.

The system then outputs, in step 42, the labeled Hindi speech data that has been aligned using the Hindi phone set. To create acoustic models from the aligned Hindi data, the conventional technique of using the context dependent trees, as explained above, may be employed in step 44. Of course, other known alternative techniques may be used.

Advantageously, using this inventive technique, the method yields much better phone models for Hindi phones which are not present in English, as compared to the earlier techniques. The acoustic models trained to Hindi speech may then be used by a speech recognition engine (not shown) to form a Hindi language speech recognition system to recognize real-time Hindi speech.

An example illustrating advantages of the invention is depicted in the table below:

|  | Original words: | |
|---|---|---|
|  | English<br>KHAALI (= Empty) | Hindi<br>KAALI (= Black Female) |
| English Baseform | /K/ /AA/ /L/ /IY/ | /K/ /AA/ /L/ /IY/ |
| Hindi Baseform | /KH/ /AA/ /L/ /IY/ | /K/ /AA/ /L/ /IY/ |

So, in accordance with the invention, the base language recognition system labels the vectors corresponding to the sound /K/ and /KH/ in the two words by a single label /K/ (as /KH/ is not present in the English phone set II). Thus, it is to be understood that the Hindi-to-English mapping in this case (e.g., as applied in mapping module 14 of FIG. 1) specifies that Hindi phones /K/ and /KH/ be mapped to English phone IKI. But while collecting the vectors for phone '/KH/' (which is not present in English), the lexeme comparator in the inventive system compares the two baseforms of the word KHAALI and understands that the base language /K/ is represented in the new language by the phone /KH/ for this particular word. So, the lexeme comparator changes the label of the vector from /K/ to /KH/. This way, a speech recognizer does not make the mistake of taking the vectors corresponding to the base language '/K/' for the new language '/KH/'. The lexeme comparator also ensures that the vectors corresponding to the new language /K/ are still labeled as /K/ as is illustrated for the word KAALI in the example. Using this inventive technique, much better initial vector clusters for '/KH/' are generated as compared to those that would be generated by merging the vectors of phones /K/ and /HH/, as is the method employed by the conventional bootstrapping procedure.

Figure 3:
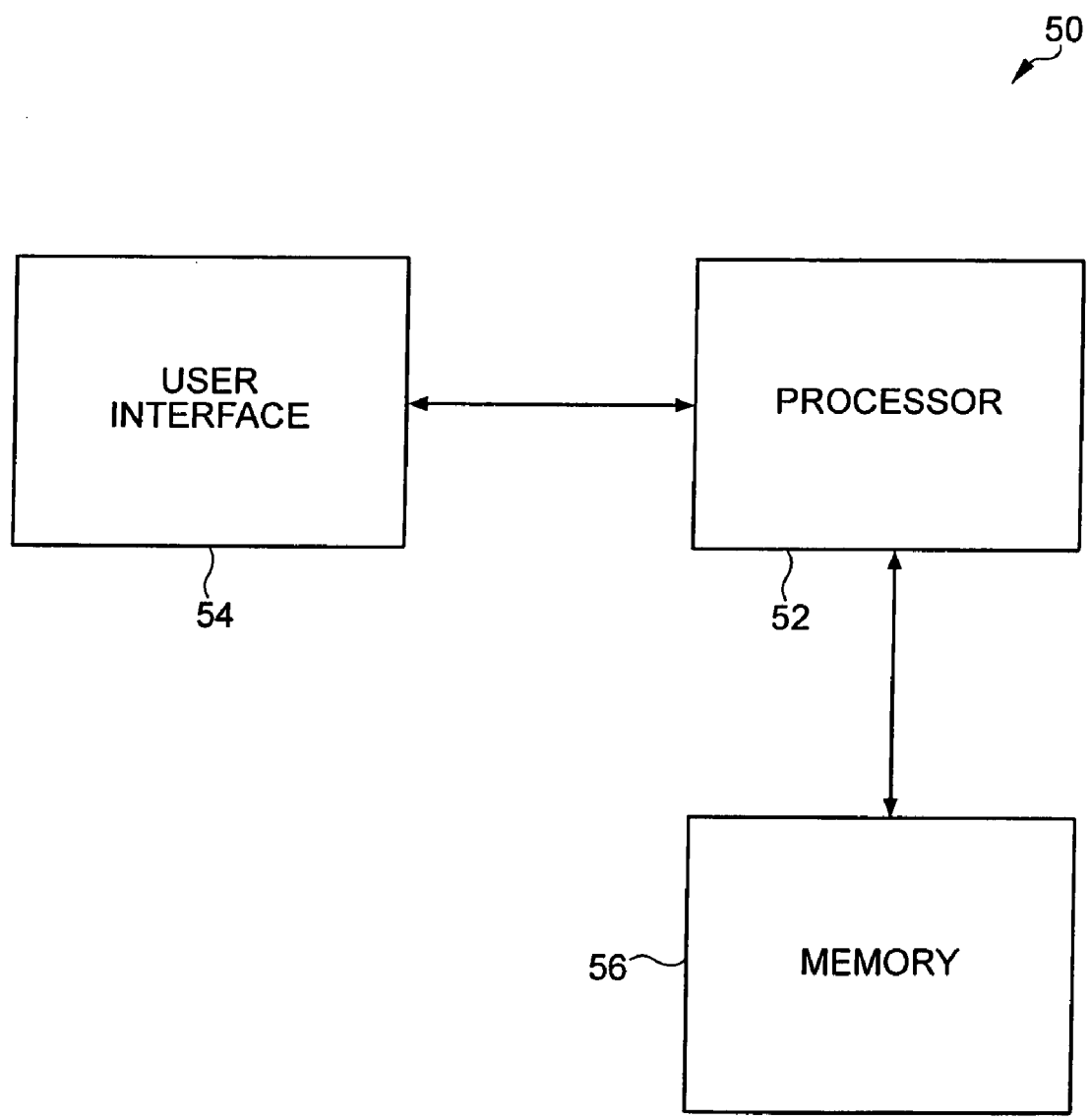
FIG. 3 is a block diagram of an illustrative hardware implementation of a data labeling system according to the invention.

Referring now to FIG. 3, a block diagram of an illustrative hardware implementation of a data labeling system according to the invention is shown. In this particular implementation 50, a processor 52 for controlling and performing the various operations associated with the illustrative system of the invention depicted in FIG. 1 is coupled to a memory 54 and a user interface 56. It is to be appreciated that the term "processor" as used herein is intended to include any processing device, such as, for example, one that includes a CPU (central processing unit) and/or other processing circuitry. For example, the processor may be a digital signal processor, as is known in the art. Also the term "processor" may refer to more than one individual processor.

The term "memory" as used herein is intended to include memory associated with a processor or CPU, such as, for example, RAM, ROM, a fixed memory device (e.g., hard drive), a removable memory device (e.g., diskette), a flash memory, etc. With reference to FIG. 1, memory 56 may also be used to implement the various storage units 12, 16, 20 and 24.

In addition, the term "user interface" as used herein is intended to include, for example, one or more input devices (e.g., keyboard, mouse, etc.) for inputting data to the processing unit, and/or one or more output devices (e.g., CRT display, printer, etc.) for providing results associated with the processing unit. The user interface 56 is also intended to include one or more audio-to-analog transducers (microphones) and one or more analog-to-digital converters which respectively transduce spoken utterances into an electrical signal and then convert the electrical signal into a digital signal representative of the speech uttered. Further, the user interface may sample the speech signal and partition the signal into overlapping frames so that each frame is discretely processed by the processor 52.

Also, the processor may implement a feature extractor (which may be considered as part of the LVCSR system 18 of FIG. 1), as is well known in the art, for receiving the speech signal and extracting cepstral features from the signal at regular intervals, for example, about every 10 milliseconds. The cepstral features may be in the form of feature or speech vectors (signals) which are then used by the system for further processing, as explained above.

Accordingly, referring again to FIG. 3, computer software including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU. In any case, it should be understood that the elements illustrated in FIG. 1 may be implemented in various forms of hardware, software, or combinations thereof, e.g., one or more digital signal processors with associated memory, application specific integrated circuit(s), functional circuitry, one or more appropriately programmed general purpose digital computers with associated memory, etc. Given the teachings of the invention provided herein, one of ordinary skill in the related art will be able to contemplate other implementations of the elements of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of aligning continuous speech data of a new language to a phone set associated with the new language using a speech recognition system trained in accordance with a base language, the method comprising the steps of:
    applying a mapping to a new language phonetic vocabulary to generate a base language phonetic vocabulary, wherein the new language phonetic vocabulary comprises new language words built using the phone set associated with the new language and wherein the base language phonetic vocabulary represents the new language phonetic vocabulary mapped to a phone set associated with the base language;
    aligning continuous speech data, input in the new language, to word lexemes in the generated base language phonetic vocabulary using the speech recognition system trained in accordance with the base language; and
    realigning the aligned speech data to the new language phone set by sequentially comparing phonetic spellings of word lexemes in the new and base language vocabularies.

2. The method of claim 1, wherein the mapping applied to the new language phonetic vocabulary is a many-to-one mapping.

3. The method of claim 1, wherein the aligning step comprises labeling feature vectors, generated from the input speech data, by phones that the feature vectors represent in the phonetic space of the base language phone set.

4. The method of claim 3, wherein the realigning step comprises relabeling the feature vectors by clustering the feature vectors according to phones of the new language phone set.

5. The method of claim 1, wherein the speech recognition system trained in accordance with the base language is a large vocabulary continuous speech recognition system.

6. A method of labeling continuous speech data of a new language with a phone set associated with the new language using a speech recognition system trained in accordance with a base language, the method comprising the steps of:
    using the speech recognition system trained in accordance with the base language to label the continuous speech data uttered in the new language using word lexemes in a base language phonetic vocabulary, wherein a new language phonetic vocabulary comprises new language words built using the phone set associated with the new language and wherein the base language phonetic vocabulary represents the new language phonetic vocabulary mapped to a phone set associated with the base language; and
    relabeling the labeled speech data using the new language phone set by sequentially comparing phonetic spellings of word lexemes in the new and base languages.

7. A method of generating a speech recognition system for a new language using a speech recognition system previously generated for a base language, the method comprising the steps of:
    applying a mapping to a new language phonetic vocabulary to generate a base language phonetic vocabulary, wherein the new language phonetic vocabulary comprises new language words built using a phone set associated with the new language and wherein the base language phonetic vocabulary represents a new language phonetic vocabulary mapped to a phone set associated with the base language;
    aligning continuous training speech data, input in the new language, to word lexemes in the generated base language phonetic vocabulary using the speech recognition system previously generated for the base language;
    realigning the aligned continuous training speech data to the new language phone set by sequentially comparing phonetic spellings of word lexemes in the new and base language vocabularies;
    constructing acoustic models using the realigned training speech data; and
    associating the constructed acoustic models with a speech recognition engine for subsequent use in recognizing real-time data input speech data uttered in the new language.

8. Apparatus for aligning continuous speech data of a new language to a phone set associated with the new language using a speech recognizer trained in accordance with a base language, the apparatus comprising:
    at least one processor operative to: (i) apply a mapping to a new language phonetic vocabulary to generate a base language phonetic vocabulary, wherein the new language phonetic vocabulary comprises new language words built using the phone set associated with the new language and wherein the base language phonetic vocabulary represents the new language phonetic vocabulary mapped to a phone set associated with the base language; (ii) align continuous speech data, input in the new language, to word lexemes in the generated base language phonetic vocabulary using the speech recognizer trained in accordance with the base language; and (iii) realign the aligned continuous speech data to the new language phone set by sequentially comparing phonetic spelling of word lexemes in the new and base language vocabularies ; and
    memory, coupled to the at least one processor, operative to store at least one of results associated with the mapping, aligning and realigning operations.

9. The apparatus of claim 8, wherein the mapping applied to the new language phonetic vocabulary is a many-to-one mapping.

10. The apparatus of claim 8, wherein the aligning operation comprises labeling feature vectors, generated from the input speech data, by phones that the feature vectors represent in the phonetic space of the base language phone set.

11. The apparatus of claim 10, wherein the realigning operation comprises relabeling the feature vectors by clustering the feature vectors according to phones of the new language phone set.

12. The apparatus of claim 8, wherein the speech recognizer trained in accordance with the base language is a large vocabulary continuous speech recognizer.

13. Apparatus for labeling continuous speech data of a new language with a phone set associated with the new language using a speech recognizer trained in accordance with a base language, the apparatus comprising:
    at least one processor operative to: (i) use the speech recognizer trained in accordance with the base language to label the continuous speech data uttered in the new language using word lexemes in a base language phonetic vocabulary, wherein a new language phonetic vocabulary comprises new language words built using the phone set associated with the new language and wherein the base language phonetic vocabulary represents the new language phonetic vocabulary mapped to a phone set associated with the base language; and (iii) relabel the labeled continuous speech using the new language phone set by sequentially comparing phonetic spellings of word lexemes in the new and base languages; and memory, coupled to the at least one processor, operative to store at least one of results associated with the obtaining, labeling and relabeling operations.

14. Apparatus for generating a speech recognizer for a new language using a speech recognizer previously generated for a base language, the apparatus comprising:

at least one processor operative to: (i) apply a mapping to a new language phonetic vocabulary to generate a base language phonetic vocabulary, wherein the new language phonetic vocabulary comprises new language words built using a phone set associated with the new language and wherein the base language phonetic vocabulary represents the new language phonetic vocabulary mapped to a phone set associated with the base language; (ii) align continuous training speech data, input in the new language to word lexemes in the generated base language phonetic vocabulary using the speech recognizer previously generated for the base language; (iii) realign the aligned continuous training speech data to the new language phone set by sequentially comparing phonetic spellings of word lexemes in the new and base language vocabularies; (iv) construct acoustic models using the realigned continuous training speech data; and (v) associate the constructed acoustic models with a speech recognition engine for subsequent use in recognizing real-time speech data uttered in the new language; and memory, coupled to the at least one processor, operative to store at least one of results associated with the applying, aligning, realigning, constructing and associating operations.

15. A continuous speech data alignment system, comprising:

a mapping module which applies a new language-to-a base language mapping to a new language phonetic vocabulary to generate a base language phonetic vocabulary, wherein the new language phonetic vocabulary comprises new language words built using a phone set associated with the new language and wherein the base language phonetic vocabulary represents the new language phonetic vocabulary mapped to a phone set associated with the base language;

a speech recognizer trained in accordance with the base language, coupled to the mapping module, which aligns continuous speech data, input in the new language to word lexemes in the generated base language phonetic vocabulary; and a lexeme context comparator, coupled to the speech recognizer, which realigns the aligned continuous speech data to the new language phone set by sequentially comparing phonetic spellings of word lexemes in the new and base languages.

16. The system of claim 15, wherein the speech recognizer trained in accordance with the base language is a large vocabulary continuous speech recognizer.

17. An article of manufacture for aligning continuous speech data of a new language to a phone set associated with the new language using a speech recognition system trained in accordance with a base language, comprising a computer readable medium containing one or more programs which when executed by a computer implement the steps of:

applying a mapping to a new language phonetic vocabulary to generate a new base language phonetic vocabulary, wherein the new language phonetic vocabulary comprises new language words built using the phone set associated with the new language and wherein the base language phonetic vocabulary represents the new language phonetic vocabulary mapped to a phone set associated with the base language;

aligning continuous speech data, input in the new language to word lexemes in the generated base language phonetic vocabulary using the speech recognition system trained in accordance with the base language; and realigning the aligned continuous speech data to the new language phone set by sequentially comparing phonetic spellings of word lexemes in the new and base language vocabularies.

18. An article of manufacture for labeling continuous speech data of a new language with a phone set associated with the new language using a speech recognition system trained in accordance with a base language, comprising a computer readable medium containing one or more programs which when executed by a computer implement the steps of:

using the speech recognition system trained in accordance with the base language to label the continuous speech data uttered in the new language using word lexemes in a base language phonetic vocabulary, wherein the new language phonetic vocabulary comprises new language words built using the phone set associated with the new language and wherein the base language phonetic vocabulary represents the new language phonetic vocabulary mapped to a phone set associated with the base language; and relabeling the labeled continuous speech data using the new language phone set by sequentially comparing phonetic spellings of word lexemes in the new and base languages.

* * * * *